United States Patent
Wu

(10) Patent No.: US 8,773,643 B2
(45) Date of Patent: Jul. 8, 2014

(54) APPARATUS AND METHOD FOR SENSING DISTANCE

(75) Inventor: Kuo-Chang Wu, Taipei (TW)

(73) Assignee: Pegatron Corporation, Taipei (TW)

( * ) Notice: Subject to any disclaimer, the term of this patent is extended or adjusted under 35 U.S.C. 154(b) by 267 days.

(21) Appl. No.: 13/397,022

(22) Filed: Feb. 15, 2012

(65) Prior Publication Data

US 2012/0206709 A1 Aug. 16, 2012

(30) Foreign Application Priority Data

Feb. 16, 2011 (TW) .............................. 100105136 A

(51) Int. Cl.
*G01S 7/481* (2006.01)
*G01C 3/08* (2006.01)
*G01S 17/48* (2006.01)

(52) U.S. Cl.
CPC . *G01S 7/481* (2013.01); *G01C 3/08* (2013.01); *G01S 17/48* (2013.01)
USPC ......... 356/4.01; 356/3.01; 356/4.1; 356/5.01; 356/5.15

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 5,512,997 A | 4/1996 | Ogawa |
| 2004/0088079 A1 | 5/2004 | Lavarec et al. |
| 2007/0097349 A1* | 5/2007 | Wada et al. ................. 356/4.06 |

FOREIGN PATENT DOCUMENTS

CN 1489702 4/2004

OTHER PUBLICATIONS

English translation of abstract of CN 1489702.
Taiwan Office Action dated Nov. 3, 2013.
"Research on the Design of Optronics Sensing System for Distance Ranging" Journal of NCUE, Jun. 2007.
English translation of cited portions of "Research on the Design of Optronics Sensing for Distance Ranging" (published Jun. 2007).

* cited by examiner

*Primary Examiner* — Luke Ratcliffe
(74) *Attorney, Agent, or Firm* — McClure, Qualey & Rodack, LLP

(57) ABSTRACT

The apparatus for sensing a distance from an object includes an emitter, a first receiver, and a second receiver. The emitter emits a light along an emitting direction toward the object. The first receiver is disposed on a side of the emitter and has a first light incident surface, wherein the first receiver receives the light reflected from the object to generate a first signal. The second receiver is disposed between the emitter and the first receiver and has a second light incident surface, wherein the second receiver receives the light reflected from the object to generate a second signal. The first receiver has a first signal-to-distance curve with a first peak, the second receiver has a second signal-to-distance curve with a second peak, and a distance corresponding to the first peak is larger than a distance corresponding to the second peak.

8 Claims, 3 Drawing Sheets

APPARATUS AND METHOD FOR SENSING DISTANCE

BACKGROUND

1. Technology Field

The disclosure relates generally to an apparatus and a method for sensing a distance, particularly, the disclosure relates to a distance sensing apparatus and a method for sensing a short distance.

2. Description of the Related Art

As technology rapidly advances, electronic apparatuses having function of sensing distance have more and more varieties. It is noted that, electronic rangefinding methods include electromagnetic distance measurement (EDM) and electro-optical distance measurement (EODM). The rangefinders for EODM include infrared rangefinders, laser rangefinders, and ultrasonic sensors etc. The ultrasonic sensors and the laser rangefinders have good measuring accuracy but are expensive. The infrared rangefinders are cheaper, but the measuring accuracy of the infrared rangefinders is not as good as the ultrasonic sensors and the laser rangefinders.

In general, a conventional infrared rangefinder includes an emitter and a receiver. The emitter generates an infrared light and transmits the infrared light to an object, while the receiver receives a light reflected from the object to generate an electrical signal. Because the conventional infrared rangefinder has only one receiver and compares the electrical signal with a constant reference voltage to determine a distance between the infrared rangefinder and the object according to the compared result. In addition, the material of the object directly influences the intensity of the reflected light. If the material of the object mostly absorbs light, the intensity of the reflected light is weak, causing the infrared rangefinder to generate a weak electrical signal and further influencing the measuring accuracy. In other examples, the infrared rangefinder cannot determine the distance due to the poor comparison result of the electrical signal and the reference voltage.

SUMMARY

The disclosure provides an apparatus and a method for sensing a distance that utilize a signal-to-distance curve for determining a smallest predetermined distance.

The disclosure also provides an apparatus and a method for sensing a distance that utilize two receivers to increase the measuring accuracy regardless of the material of an object.

The disclosure further provides an apparatus and a method for sensing a distance to determine a short distance accurately by adjusting an angle and/or a position between a receiver and an emitter.

In an embodiment, the apparatus of the present invention includes an emitter, a first receiver, and a second receiver.

In the embodiment, the emitter emits a light along an emitting direction toward the object. The first receiver having a first light incident surface is disposed on a side of the emitter and receives the light reflected from the object to generate a first signal. The second receiver having a second light incident surface is disposed between the emitter and the first receiver and receives the light reflected from the object to generate a second signal. The first receiver has a first signal-to-distance curve with a first peak, the second receiver has a second signal-to-distance curve with a second peak, and a distance corresponding to the first peak is larger than a distance corresponding to the second peak.

In the embodiment, a distance corresponding to an intersection point of the first signal-to-distance curve and the second signal-to-distance curve is a predetermined distance, wherein the second signal is larger than the first signal when the distance from the object is smaller than the predetermined distance, and the second signal is smaller than the first signal when the distance from the object is larger than the predetermined distance.

In the embodiment, the emitter has a light-exiting surface for outputting the light, wherein a first angle is formed between the normal of the first light incident surface of the first receiver and the normal of the light-exiting surface of the emitter, a second angle is formed between the normal of the second light incident surface of the second receiver and the normal of the first light incident surface of the first receiver, and the first angle and the second angle are determined according to the predetermined distance.

In another embodiment, the method for sensing a distance from an object is provided, the method includes: providing a distance sensing apparatus including a emitter, a first receiver, and a second receiver, wherein the first receiver and the second receiver are disposed on a side of the emitter, the first receiver has a first signal-to-distance curve with a first peak, the second receiver has a second signal-to-distance curve with a second peak, and a distance corresponding to the first peak is larger than a distance corresponding to the second peak; the emitter emitting a light along an emitting direction toward the object; the first receiver and the second receiver respectively receiving the light reflected from the object to generate a first signal and a second signal; and according to the first signal and the second signal, determining the distance from the object or determining whether the object is within a predetermined distance.

Particularly, a distance corresponding to an intersection point of the first signal-to-distance curve and the second signal-to-distance curve is the predetermined distance, wherein the second signal is larger than the first signal when the distance from the object is smaller than the predetermined distance, and the second signal is smaller than the first signal when the distance from the object is larger than the predetermined distance.

The apparatus and the method for sensing a distance, which utilize the first receiver and the second receiver to generate the first signal and the second signal, not only determine a distance from the object, but also determine whether the object is within the predetermined distance according to the relationship between the first signal and the second signal with an increased measuring accuracy. In addition, the distance sensing apparatus of the present invention utilizes the relationship between the first signal and the second signal to determine whether the object is within the predetermined distance, increasing the measuring accuracy effectively regardless of the material of the object.

The detailed descriptions and the drawings thereof below provide further understanding about advantage and the spirit of the present invention.

DETAILED DESCRIPTION OF THE PREFERRED EMBODIMENT

One embodiment of the present invention is a distance sensing apparatus. In the embodiment, the apparatus for sensing a distance is a distance sensing apparatus that senses a predetermined distance from an object and determine whether the object is within a predetermined distance. In the embodiment, the distance sensing apparatus and the method for sensing a distance can be used to a short distance determination, but not limited thereto.

Figure 1:
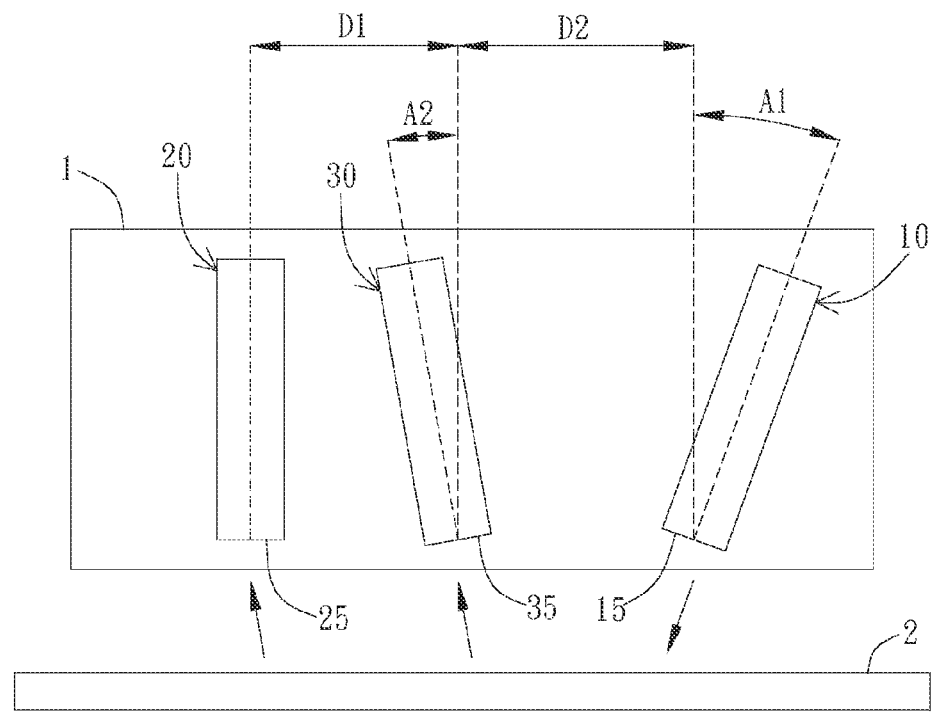
FIG. 1 is a top view of an embodiment of a distance sensing apparatus.

Please refer to FIG. 1, FIG. 1 is a top view of an embodiment of a distance sensing apparatus 1. In practice, the shape of the distance sensing apparatus 1 is set according to practical requirements of the product; for example, the shape may be square, ellipse, or other suitable shapes, but not limited thereto.

As shown in FIG. 1, the distance sensing apparatus 1 includes an emitter 10, a first receiver 20, and a second receiver 30. The first receiver 20 is disposed on a side of the emitter 10 and has a first light incident surface 25. The second receiver 30 is disposed between the emitter 10 and the first receiver 20 and has a second light incident surface 35. The emitter 10 has a light-exiting surface 15 for outputting a light. The emitter 10 emits the light along an emitting direction toward an object 2. In practical applications, the emitter 10 is an infrared emitter. The first receiver 20 receives the light reflected from the object 2 to generate a first signal, and the second receiver 30 receives the light reflected from the object 2 to generate a second signal. In other words, the first receiver 20 and the second receiver 30 receive the light that is emitted from the emitter 10 toward the object 2 and reflected by the object 2 to respectively generate the first signal and the second signal corresponding to the energy/intensity of the light received.

Figure 2:
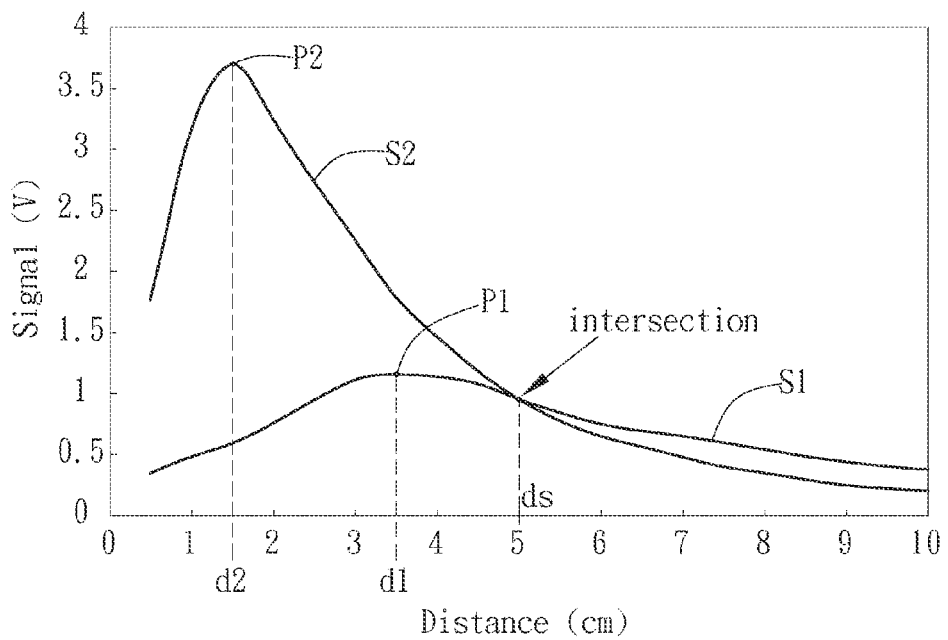
FIG. 2 is a diagram showing the signal-to-distance curves of the first receiver and the second receiver.

Particularly, the first receiver 20 has a first signal-to-distance curve S1 with a first peak P1. The second receiver 30 has a second signal-to-distance curve S2 with a second peak P2. A distance d1 corresponding to the first peak P1 is larger than a distance d2 corresponding to the second peak P2. As shown in FIG. 2, a distance corresponding to an intersection point of the first signal-to-distance curve S1 and the second signal-to-distance curve S2 is a predetermined distance ds, wherein the second signal is larger than the first signal when the distance from the object is smaller than the predetermined distance ds; the second signal is smaller than the first signal when the distance from the object is larger than the predetermined distance ds. The relationship between the first signal-to-distance curve S1, the second signal-to-distance curve S2, the predetermined distance ds, the first signal, and the second signal will be explained later.

As shown in FIG. 1, a first angle A1 is formed between the normal of a first light incident surface 25 of the first receiver 20 and the normal of a light-exiting surface 15 of the emitter 10. Similarly, a second angle A2 is formed between the normal of a second light incident surface 35 of the second receiver 30 and the normal of the first light incident surface 25 of the first receiver 20. In addition, a first distance D1 and a second distance D2 exist between the first receiver 20 and the emitter 10 and between the emitter 10 and the second receiver 30, respectively.

It is noted that the first distance D1/the second distance D2 and the first angle A1/the second angle A2 are chosen so that according to the relationship between the first signal and the second signal, the object 2 can be determined whether within the predetermined distance.

Particularly, the relative position and the relative angle of the second receiver 30 and the emitter 10 are adjusted so that the amplitude of the first signal is equal to that of the second signal when the object 2 is located at the predetermined distance. In the embodiment, the predetermined distance is 5 cm; the first signal and the second signal are analog voltages, but not limited thereto. In practical applications, the first distance D1 is between 8~10 mm, preferably 9 mm; the second distance D2 is between 13~15 mm, preferably 14 mm. In addition, the first angle A1 is between 6~8°, preferably 7'; the second angle A2 is between 1~3°, preferably 2°.

Please refer to FIG. 2, FIG. 2 is a diagram showing the signal-distance curves of the first receiver 20 and the second receiver 30. In other words, adjusting the angle and the position of the receivers can cause a unique relationship between the distance and the signal. As shown in FIG. 2, based on the preset position described above, the first angle A1 and the second angle A2 are selected so that the first receiver 20 and the second receiver 30 respectively have a first signal-to-distance curve S1 and a second signal-to-distance curve S2 with different peaks, wherein the first signal-to-distance curve S1 and the second signal-to-distance curve S2 have an intersection point, and the distance corresponding to the intersection point of the first signal-to-distance curve S1 and the second signal-to-distance curve S2 is the predetermined distance. For example, in the embodiment, the first angle A1 is between 6~8°, preferably 7°; the second angle A2 is between 1~3°, preferably 2°.

As shown in FIG. 2, the second signal is larger than the first signal when the distance is 0.5 cm. The first signal is getting larger and larger slowly, and the second signal is getting larger and larger quickly when the distance is increased from 0.5 cm toward 1.5 cm. As the distance is increased from 0.5 cm to 1.5 cm, because the position of the second receiver 30 is disposed nearer the emitter 10 than the first receiver 20, more reflected light is transmitted to the second receiver 30 within the distance range, and the variation of the signal-to-distance curve of the second receiver 30 is more obvious. The first signal is getting larger and larger slowly, and the second signal is getting smaller and smaller quickly when the distance is increased from 1.5 cm toward 3.5 cm. Because of the relationship between the reflecting angle and the distance, the first receiver 20 receives more reflected light than the second receiver 30.

Less reflected light is received by the first receiver 20 and the second receiver 30 when the distance is increased from 3.5 cm to 5 cm, so that the first signal and the second signal are getting smaller and smaller. However, because the reduction rate of the first signal is slower than the reduction rate of the second signal, the intersection point is formed between the first signal-to-distance curve and the second signal-to-distance curve, wherein the intersection point is located at the distance of 5 cm, which is the predetermined distance. The first signal and the second signal keep becoming smaller and smaller slowly when the distance is increased from 5 cm to 10 cm, and the variation of the second signal is larger than the variation of the second signal, so that the second signal becomes smaller than the first signal.

It is noted that in such a case, the second signal is larger than the first signal when the object 2 is within the predetermined distance (for example, 5 cm); the second signal is smaller than the first signal when the object 2 is located beyond the predetermined distance (for example, 5 cm). Hence, the distance sensing apparatus 1 can determine according to the first signal, the second signal, the first signal-to-distance curve, and the second signal-to-distance curve whether the object 2 is within the predetermined distance. In other words, the user can set a desired nearest distance as the predetermined distance and further adjust the relative angle and/or the relative position of the emitter 10, the first receiver 20, and the second 30 according to the predetermined distance to obtain the first signal-to-distance curve S1 and the second signal-to-distance curve S2, wherein the predetermined distance is the distance corresponding to the intersection point of the first signal-to-distance curve S1 and the second signal-to-distance curve S2. Hence, the distance sensing apparatus 1 not only determines whether the object 2 is within the predetermined distance according to the relationship between the first signal and the second signal, but also directly determines the distance according to the electrical signal generated from the light reflected from the object 2 by the first receiver 20 and/or the second receiver 30.

Figure 3:
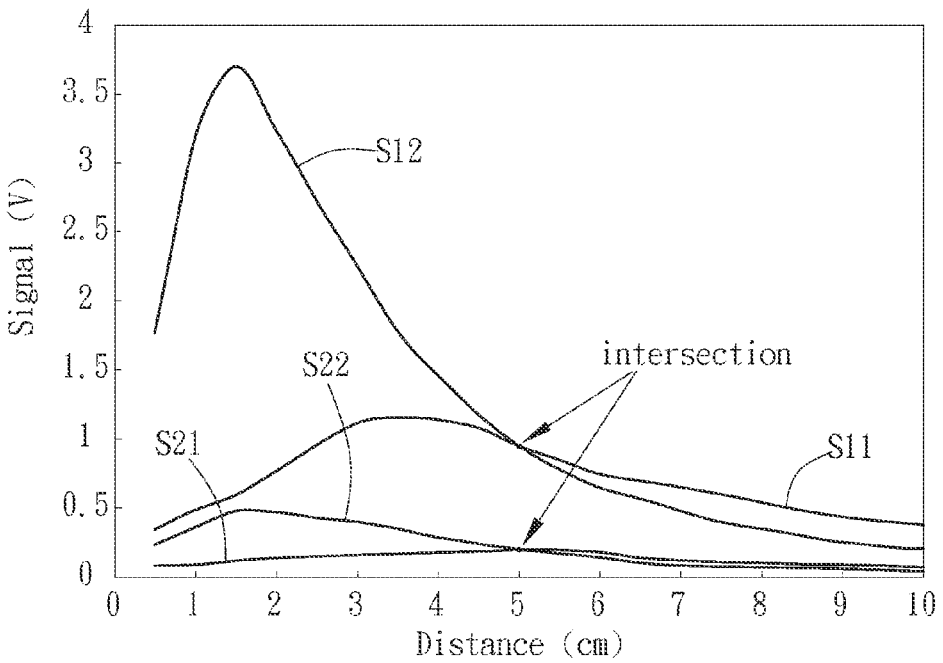
FIG. 3 is a signal-to-distance curve diagram for different objects.

Please refer to FIG. 3, FIG. 3 is a signal-distance curve diagram for different objects (for example, the first object and the second object). In the embodiment, the materials of the first object and the second object are different. In other words, the first object and the second object are different in absorption rate of the light emitted from the emitter 10. For example, the first object is a wood plate, and the second object is a black paper. As shown in FIG. 3, because the reflectivity of the second object (i.e. the black paper) is smaller than the reflectivity of the first object (i.e. the wood plate), the first signal and the second signal corresponding to the second object are both weaker than the first signal and the second signal corresponding to the first object.

As shown in FIG. 3, in the embodiment, the predetermined distance is 5 cm. in other words, the first receiver 20 and the second receiver 30 respectively have a first signal-to-distance curve S11 and a second signal-to-distance curve S12 for the first object and a first signal-to-distance curve S21 and a second signal-to-distance curve S22 for the second object. As shown in FIG. 3, based on the relative angle and the relative position mentioned above, the curves S11, S12, S21, and S22 have a similar tendency even though the first receiver 20 and the second receiver 30 have different signal intensities for the first object and the second object. In other words, as shown in FIG. 3, the intersection of the first signal-to-distance curve S11 and the second signal-to-distance curve S12 and the intersection of the first signal-to-distance curve S21 and the second signal-to-distance curve S22 correspond to the distance of 5 cm. Particularly, within the predetermined distance (for example, 5 cm), the first signal of the first signal-to-distance curve S11 (or the first signal-to-distance curve S21) is smaller than the second signal of the second signal-to-distance curve S12 (or the second signal-to-distance curve S22); beyond the predetermined distance (for example, 5 cm), the first signal of the first signal-to-distance curve S11 (or the first signal-to-distance curve S21) is larger than the second signal of the second signal-to-distance curve S12 (or the second signal-to-distance curve S22). Hence, the distance sensing apparatus 1 of the present invention has good measuring accuracy for sensing different objects even though materials of the objects are different (i.e. the reflecting effects of the objects are different). Hence, the distance sensing apparatus 1 of the present invention utilizes the relationship between the first signal and the second signal of the receivers to determine whether the object is within the predetermined distance, effectively increasing measuring accuracy regardless of the material of the object.

Figure 4:
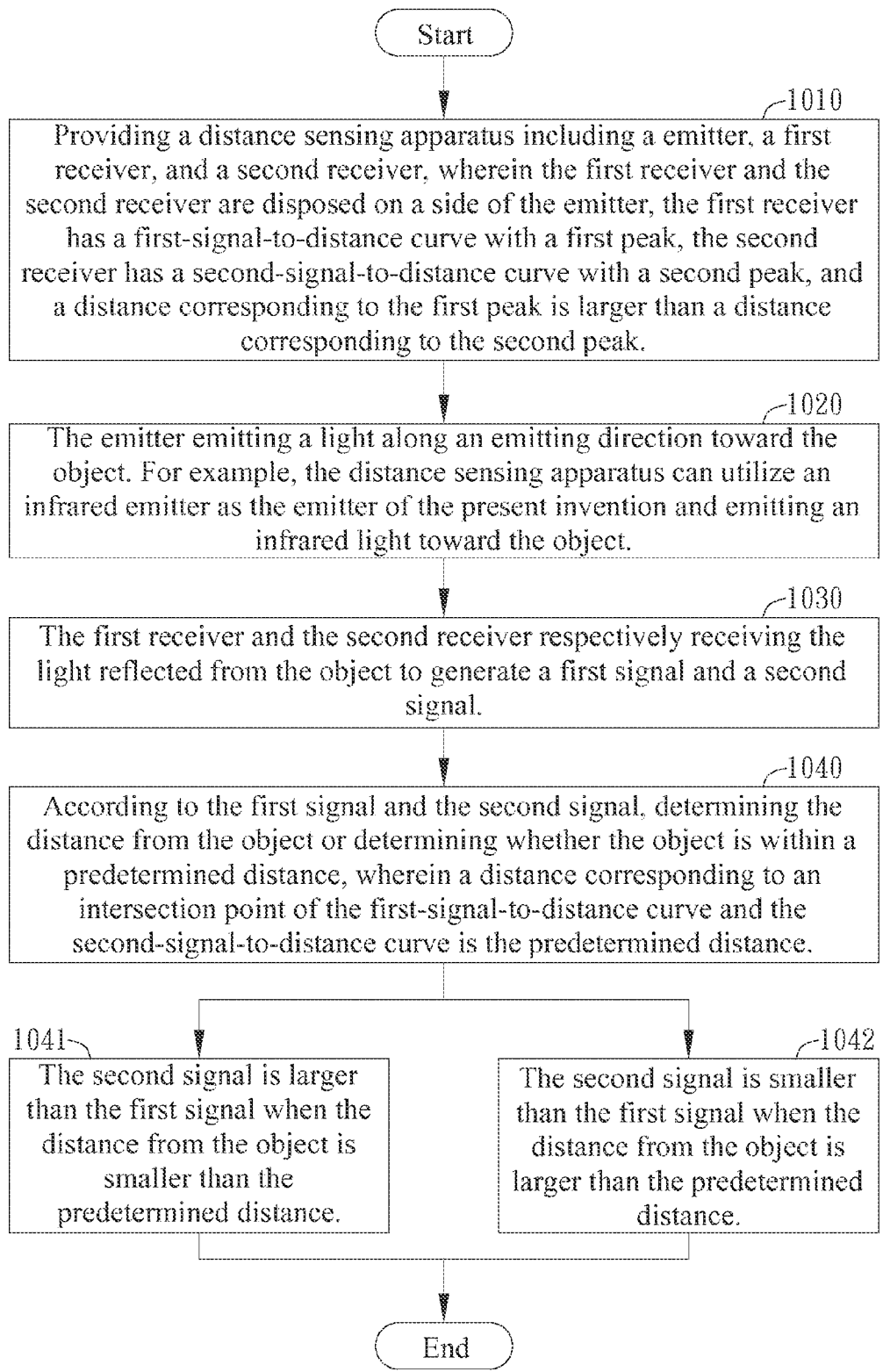
FIG. 4 is a flowchart of the distance sensing method of the present invention.

FIG. 4 is a flowchart of the method for sensing a distance of the embodiment. The method for sensing a distance includes a step 1010 of providing a distance sensing apparatus including an emitter, a first receiver, and a second receiver, wherein the first receiver and the second receiver are disposed on a side of the emitter. The first receiver has a first signal-to-distance curve with a first peak, the second receiver has a second signal-to-distance curve with a second peak, and a distance corresponding to the first peak is larger than a distance corresponding to the second peak. The distance sensing apparatus as shown in FIG. 1 is provided, wherein the second receiver is disposed between the first receiver and the emitter, but not limited thereto. In addition, as mentioned above, adjusting the relative angle and the relative position of the first receiver and the second receiver causes the first receiver and the second receiver to obtain the first signal-to-distance curve and the second signal-to-distance curve, respectively.

A step 1020 includes the emitter emitting a light along an emitting direction toward the object. For example, the distance sensing apparatus can utilize an infrared emitter as the emitter of the present invention, which emits an infrared light toward the object.

A step 1030 includes the first receiver and the second receiver respectively receiving the light reflected from the object to generate a first signal and a second signal. For example, the first receiver and the second receiver receive respectively the infrared light reflected from the object to generate the signals corresponding to the energy of reflected infrared light received by the first receiver and the second receiver.

A step 1040 includes, according to the first signal and the second signal, determining the distance from the object or determining whether the object is within a predetermined distance, wherein a distance corresponding to an intersection point of the first signal-to-distance curve and the second signal-to-distance curve is the predetermined distance. The predetermined distance is the nearest distance that the user intends to measure, for example, 5 cm, but not limited thereto. In other words, the predetermined distance can be determined according to practical applications and user requirements. A step 1041 includes determining the distance from the object to be smaller than the predetermined distance when the second signal is larger than the first signal. A step 1042 includes determining the distance from the object to be larger than the predetermined distance when the second signal is smaller than the first signal.

The apparatus for sensing a distance not only determine the distance from the object, but also set the predetermined distance based on the signal-to-distance curves. In addition, the distance sensing apparatus and the method for sensing a distance utilizes the first receiver and the second receiver to generate the first signal and the second signal, wherein the distance sensing apparatus utilizes the relationship between the first signal and the second signal to determine whether the object is within the predetermined distance, increasing the measuring accuracy regardless of the material of the object to be measured. The conventional distance sensing apparatus only has one emitter and one receiver and compares the signal of the receiver with a reference signal (voltage), resulting in a limited measuring effect, especially not suitable for the sensing of short distance. Hence, the distance sensing apparatus of the present invention can not only determine a distance from the object, but also determine whether the object is within the predetermined distance according to the first signal and the second signal, increasing the measuring accuracy effectively regardless of the material of the object. That is, the material of the object to be measured has less influence or even no influence on the distance sensing apparatus of the present invention and the method thereof, resulting in the increased measuring accuracy.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An apparatus for sensing a distance from an object, comprising:
   an emitter emitting a light along an emitting direction toward the object;
   a first receiver having a first light incident surface, the first receiver being disposed on a side of the emitter and receiving the light reflected from the object to generate a first signal; and
   a second receiver having a second light incident surface, the second receiver being disposed between the emitter and the first receiver and receiving the light reflected from the object to generate a second signal;
   wherein the first receiver has a first signal-to-distance curve with a first peak, the second receiver has a second signal-to-distance curve with a second peak, and a distance corresponding to the first peak is larger than a distance corresponding to the second peak; a distance corresponding to an intersection point of the first signal-to-distance curve and the second signal-to-distance curve is a predetermined distance; a first angle is formed between a normal of the first light incident surface of the first receiver and a normal of a light-exiting surface of the emitter, a second angle is formed between a normal of the second light incident surface of the second receiver and the normal of the first light incident surface of the first receiver, and the first angle and the second angle are determined according to the predetermined distance.

2. The apparatus of claim 1, wherein the second signal is larger than the first signal when the distance from the object is smaller than the predetermined distance; the second signal is smaller than the first signal when the distance from the object is larger than the predetermined distance.

3. The apparatus of claim 1, wherein the first angle is between 6° and 8°, and the second angle is between 1° and 3°.

4. The apparatus of claim 1, wherein a first distance exists between a midpoint of the first light incident surface and a midpoint of the second light incident surface, a second distance exists between the midpoint of the second light incident surface and a midpoint of the emitter, and the first distance and the second distance are determined according to the predetermined distance.

5. The apparatus of claim 4, wherein the first distance is between 8 mm and 10 mm, and the second distance is between 13 mm and 15 mm.

6. The apparatus of claim 1, wherein the emitter is an infrared emitter.

7. A method for sensing a distance from an object, comprising:
   providing an apparatus comprising a emitter, a first receiver, and a second receiver, wherein the first receiver and the second receiver are disposed on a side of the emitter, the first receiver has a first signal-to-distance curve with a first peak, the second receiver has a second signal-to-distance curve with a second peak, and a distance corresponding to the first peak is larger than a distance corresponding to the second peak;
   emitting a light along an emitting direction toward the object by the emitter;
   receiving the light reflected from the object to generate a first signal and a second signal by the first receiver and the second receiver, respectively; and
   determining the distance from the object or determining whether the object is within a predetermined distance according to the first signal and the second signal; wherein the predetermined distance is a distance corresponding to an intersection point of the first signal-to-distance curve and the second signal-to-distance curve; a first angle is formed between a normal of a first light incident surface of the first receiver and a normal of a light-exiting surface of the emitter, a second angle is formed between a normal of a second light incident surface of the second receiver and the normal of the first light incident surface of the first receiver, and the first angle and the second angle are determined according to the predetermined distance.

8. The method of claim 7, wherein when the second signal is larger than the first signal, the distance from the object is determined smaller than the predetermined distance; when the second signal is smaller than the first signal, the distance from the object is determined larger than the predetermined distance.

* * * * *